June 18, 1940.  A. KALIN  2,205,264
SYNCHROPHASING SYSTEM
Original Filed May 9, 1936  2 Sheets-Sheet 1

Inventor:
Albert Kalin
By
Wilson, Dowell,
McCanna & Wintercorn
Attys.

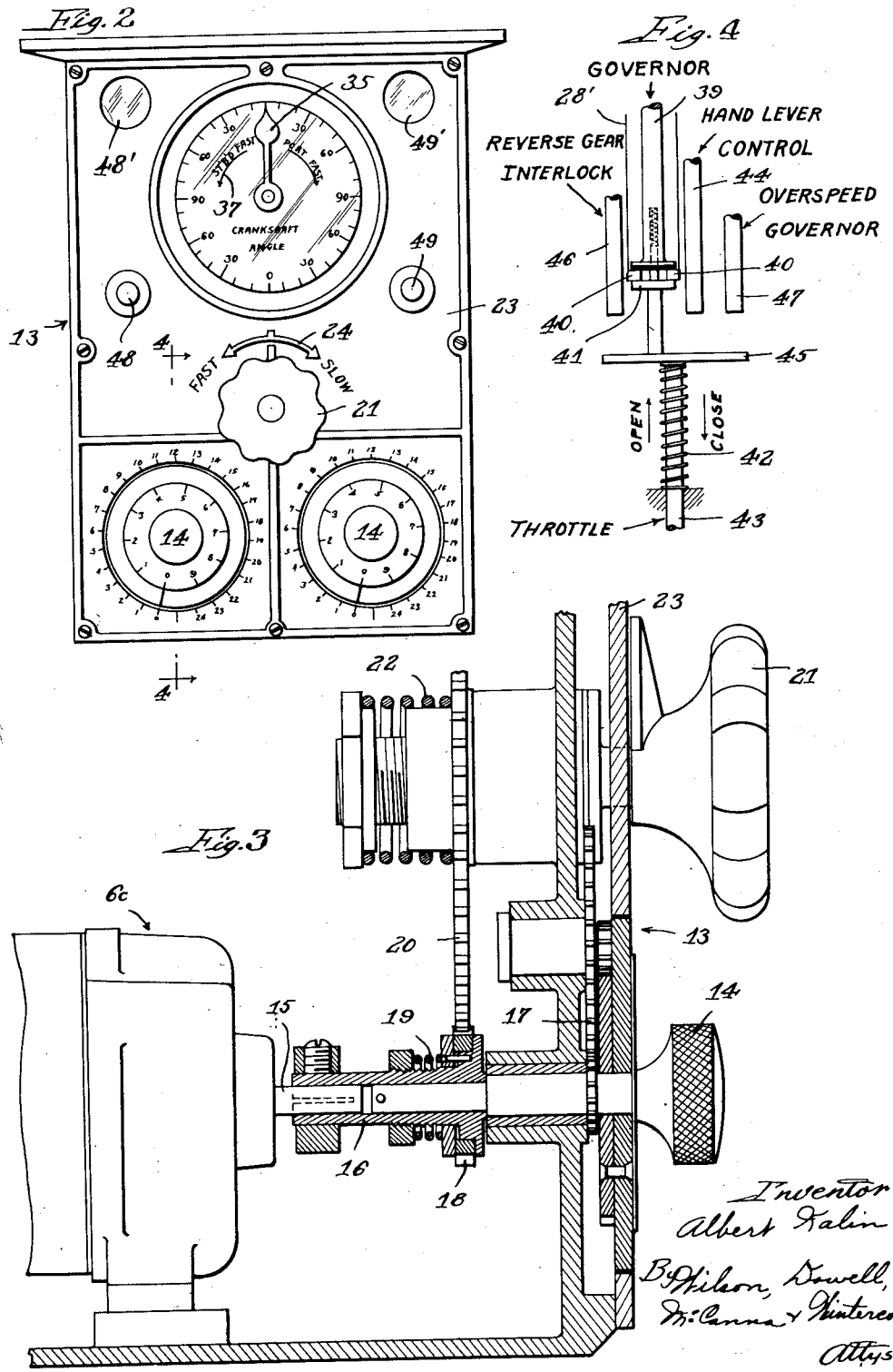

Patented June 18, 1940

2,205,264

UNITED STATES PATENT OFFICE 2,205,264

SYNCHROPHASING SYSTEM

Albert Kalin, Rockford, Ill., assignor to Woodward Governor Company, Rockford, Ill., a corporation of Illinois Application May 9, 1936, Serial No. 78,869
Renewed August 25, 1937

8 Claims. (Cl. 60—97)

This invention relates to a new and improved system of synchrophasing, that is, synchronizing and phasing, and is herein disclosed in connection with the main propulsion engines of a multiple screw ship to synchronize the same through interconnected speed governors, so that any desired instantaneous phase angle between the main crank-shafts may be maintained indefinitely under normal cruising conditions. The system is, however, applicable to the synchrophasing of prime movers generally, such as steam turbines, electric motors and Diesel engines, and will be useful not only on sea-going ships and yachts, but also on airplanes and dirigibles, and wherever a similar problem of synchronizing and phasing may be presented, as, for example, the synchronization of various parts of a paper making machine; the synchronization of the pump-driving engines or motors in oil or other pipe lines; the reduction of vibration in a ship due to unbalanced propeller action by offsetting irregularity of one propeller against the irregularity of the other by proper phase adjustment thereof while in synchronism, etc.

In the application of this system to multiple engine ships, the periodic vibration beat, present when engines operate at slightly different speeds, is eliminated by synchronization and the vibration level is materially reduced by adjusting the instantaneous angle between crank-shafts while under way to that value giving minimum overall hull vibration. Ordinarily only a pleasing hum remains when the point of minimum vibration is maintained continuously.

My system of synchrophasing involves the application of isochronous governors to the respective engines, and, in the electrical embodiment, the application of what are known as Selsyn motors, that is, self-synchronizing or alternating current position-receiver, to these governors for remote control purposes, the driving of other self-synchronizing motors from the crank-shafts of the respective engines, and the interconnection of the first-mentioned motors with the last-mentioned motors in a remote control cabinet, so that regardless of momentary differences in load upon the two engines, any desired instantaneous phase angle between the crank-shafts may be maintained indefinitely, and vibration is accordingly reduced to a minimum.

The control cabinet in the present embodiment contains a self-synchronizing motor or differential position-receiver connected with the two crank-shaft motors and carrying a needle on the armature shaft thereof to indicate, by the motionless needle, when the two engines are operating in synchronism, and also by the angle of the needle the phase relationship between the cranks of the two engines. The cabinet also contains two other self-synchronizing motors or differential position-transmitters electrically connected with the governor control motors and equipped with hand operable dials on the armature shafts thereof to permit manual adjustment of either governor, or both governor simultaneously, by remote control to slow down or speed up one engine with respect to the other at will, and thus bring the two engines into step with one another—that is, into both synchronism and phase. A single master control dial on the control cabinet has a friction drive connection with the last-mentioned dials permitting adjustment of either dial independently of the master control dial, but permitting simultaneous adjustment of both dials by the master control dial, whereby to speed up or slow down the two engines simultaneously without disturbing the spnchrophase adjustment. A selector switch is also provided in the control cabinet normally disposed in one position permitting independent speed and phase adjustment of the engines with respect to one another, but arranged to be thrown to another position interconnecting the two sets of engine controls so as to cause an opposite adjustment automatically upon the governor of the companion engine when the load upon one of the engines is suddenly decreased or increased and a compensating positive or negative adjustment of its governor occurs. The system further includes governor interlock switches which are closed only when the engines are operating on governor control, whereby to automatically throw out the synchrophase control the instant the throttle of either engine is manually manipulated, such as in answer to an emergency signal.

The invention will be better understood as reference is made in the following description to the accompanying drawings, wherein—

Fig. 2 is a front view of the control cabinet;

Fig. 3 is a sectional detail on an enlarged scale taken on the line 3—3 of Fig. 2, and Fig. 4 is a mechanical diagram illustrating how the synchrophasing system is arranged to be thrown out of service when manual control of either throttle occurs, and in other ways designated.

The same reference numerals are applied to corresponding parts throughout the views.

Figure 1:
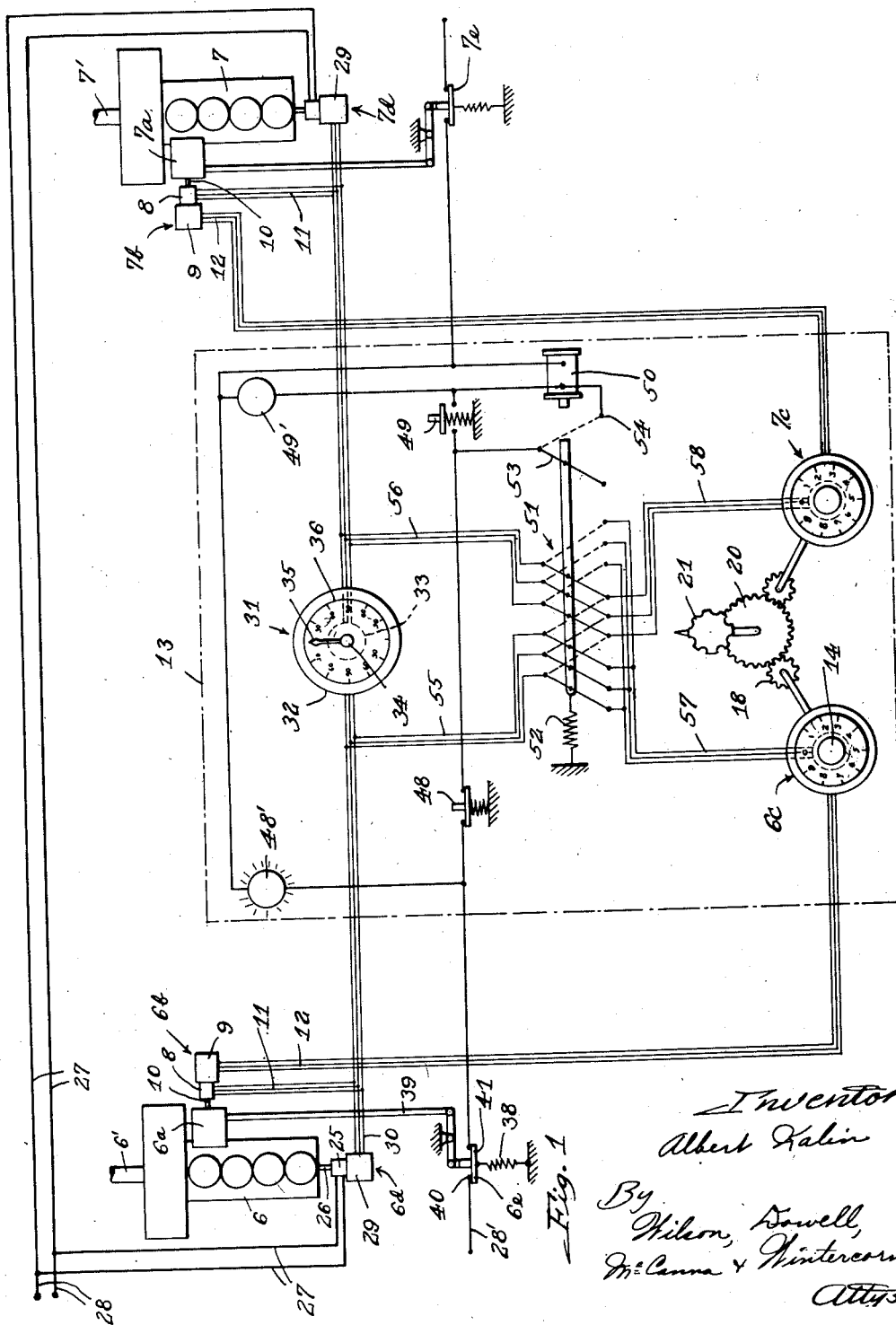
Figure 1 is a wiring diagram of my improved system.

Referring to Fig. 1, the prime movers to be controlled to operate in synchronism and exact phase, or some special phase relationship desired, may be any of the types previously mentioned, in any of the installations referred to. Those herein numbered 6 and 7 are the main propulsion engines of a multiple screw ship, the crankshafts 6' and 7' being connected through the usual transmission with the propeller screws for forward or reverse drive. These engines may be any type of internal combustion engines but are here intended to be of the Diesel type controllable as to speed by operation of their throttles by means of isochronous governors 6a and 7a, as disclosed in my copending application Serial No. 27,037, filed June 17, 1935, now Patent No. 2,117,891. The governors, the flyball mechanisms of which are driven by the engines, are subject to adjustment to regulate the speed of the engines by increasing or decreasing the pressure of the speeder springs in the fly-ball mechanisms of the governors. Furthermore, the speed adjustment for the governors is arranged to be effected by means of alternating current differential position-receivers or self-synchronizing motors 6b and 7b, known commercially as "Selsyn" motors. 8 and 9 designate the primary and secondary of these receivers, 8 in this case being the rotor and 9 the stator, as diagrammatically illustrated in the drawings, 10 being the shaft connecting the rotor 8 with the speeder spring adjustment in the associated governor. At 11 are indicated the three wires which extend to the usual three brushes of the rotor 8, and at 12 the three wires which extend from the stator, the receivers 6b and 7b being what are known as "differential" type. The other self-synchronizing motors 6c and 7c of the same type, but in this case acting as differential position-transmitters are provided in a control cabinet 13 for remote control of the receivers 6b and 7b, respectively, whereby to effect remote control of the governors 6a and 7a, respectively. The wires 12 interconnect the stators of the associated receiver and transmitter 6b and 6c, on the one hand, and of the associated receiver and transmitter 7b and 7c on the other hand, so that when the rotor of one of the transmitters 6c or 7c is turned, the rotor of the associated receiver 6b or 7b will be turned correspondingly and through precisely the same angular distance.

Each of the position transmitters 6c and 7c, in accordance with one aspect of the present invention, has a dial or knob 14 arranged to be turned by hand so as to turn the rotor of the associated transmitter by means of its shaft 15 to which the dial is connected through a suitable coupling 16. Vernier reduction gearing, indicated at 17, permits very accurate indication to be given of the dial adjustment. A pinion 18 is frictionally clutched to the body of the coupling 16 under pressure of a light spring 19, whereby to permit turning the coupling 16 by means of the dial 14 independently of the pinion 18, but still permit the coupling 16 to be turned by the pinion 18 when the latter is turned by the gear 20 under control of a master control dial or knob 21. The gear 20 is frictionally clutched to turn with the dial 21 under pressure of a spring 22, similarly as the pinion 18 is clutched to turn with the coupling 16. However, the spring 22 affords much heavier pressure, sufficient to provide for the driving of both pinions 18 by the gear 20 when the dial 21 is turned, and sufficient too to prevent turning of the gear 20 by either of the pinions 18 in the event one of the dials 14 is turned for an independent operation of one of the position transmitters 6c or 7c. Thus, it should be clear from the foregoing description that I am enabled to slow down or speed up either engine by remote control by turning the associated dial 14 in a counterclockwise direction in slowing down, and in a clockwise direction in speeding up, the adjustment of either dial leaving the adjustment of the other dial unaffected. If both dials are turned simultaneously in a clockwise direction, the engines will accordingly be speeded up simultaneously, and they may be slowed down simultaneously by simultaneously turning both dials in a counterclockwise direction. Hence, since the dial 21 is interconnected with the dials 14, it is apparent that the mere turning of this master dial in one direction will cause the speeding up of the two engines simultaneously, and the engines may likewise be slowed down simultaneously by turning said dial in the opposite direction. The front panel 23 on the control cabinet 13 is marked, as indicated at 24, to indicate which way the dial should be turned for increased or decreased speed of the engines.

The foregoing description serves to indicate how the governors 6a and 7a may be employed to bring the engines 6 and 7 to the same speed, that is, to bring them into synchronism. My system of control, however, involves not only synchronizing, but phasing. In other words, the cranks of the shafts 6' and 7' must be kept at the same instantaneous angle. This is accomplished by providing standard self-synchronizing motors or position-transmitters 6d and 7d, the primary or rotor 25 of each of which is driven by the engine through any suitable power take-off, although a direct connection is shown at 26 with the crankshaft. The two wires shown at 27 connected to two brushes engaging the rotor 25 are connected with a source 28 of 110 volt, 60 cycle, alternating current. The secondary or stator 29 has three wires extending therefrom, as indicated at 30, connected with the wires 11 previously referred to, whereby to afford a source of excitation for the differential position-receivers 6b and 7b. The wires 30 also extend to the control cabinet 13 where the wires from one of the transmitters 6d—7d are connected with the stator of a differential self-synchronizing motor or position-receiver 31, the wires 30 from the other transmitter being connected with the brushes cooperating with the rotor of the differential position-receiver 31. For the sake of convenience in illustrating this in the diagrammatic showing of Fig. 1, 32 designates the stator or secondary connected with the wires 30 from the transmitter 6d, and the rotor or primary is indicated in dotted lines at 33 connected with the wires 30 leading to the transmitter 7d. 34 designates the armature shaft of the differential position-receiver 31 on which a pointer or needle 35 is arranged to turn with respect to a dial 36 on or in the front panel 23 of the control cabinet 13 (see Fig. 2). The needle 35, in the event one of the engines is operated alone, will turn at the same speed as the crank-shaft, owing to the fact that the rotor 25 is electrically coupled with the rotor 33 by reason of the interconnection of the transmitters 6d and 7d with differential position-receiver 31. Now, if the other engine is started running, the needle 35 will slow down more and more as the second engine is speeded up more and more until finally when the second engine reaches the same speed as the first engine, the needle 35 will stand still. Furthermore, the position at which the needle 35 comes to a standstill is an indication of the angle relationship of the cranks of the two engines; in the "12 o'clock" position, indicated in Figs. 1 and 2, the corresponding cranks of shafts 6' and 7' have the same instantaneous angle, that is, they are exactly in phase. One can by manipulation of the dials 14 speed up one engine to match the speed of the other, or slow down one engine to the speed of the other to bring the needle 35 to a standstill. The dial 36, as shown in Fig. 2, contains arrows 37 labeled to show in accordance with the movement of the needle in one direction or the other whether the starboard or port engine is faster. Then after the needle has been brought to a standstill, if it happens to be say at a "3 o'clock" or "9 o'clock" position, showing a crank-shaft angle difference of 90° between the two engines, it is obvious that the two engines can be brought into phase as well as synchronism by momentarily vary the speed of either one or both engines. In particular, if the engines are in synchronism, but out of phase with the starboard engine crank shaft leading that of the port engine then the speed of the starboard engine can be momentarily checked and then returned to its previous speed. This momentary checking of the speed of the starboard engine will, of course, cause its crank shaft to occupy a somewhat more delayed angular position. In this way the angular position of the starboard engine crank shaft with respect to that of the port engine can be gradually changed until the needle 35 indicates that the two are in phase. Similarly, under the conditions assumed, the port engine could be momentarily speeded up and then returned to its previous speed setting with a consequent change in the angular position of its crank shaft with respect to that of the starboard engine, so that the two crank shafts are finally brought into phase by this type of adjustment. If desired the two engine speeds may be momentarily changed in opposite senses so as to more quickly accomplish the desired phasing operation. In any event the engines are finally restored to their previous speeds so that they will continue to operate in synchronism as they were doing at the beginning of the phasing operation.

With the arrangement described above it will be appreciated that the governors 6a and 7a for the respective prime movers 6 and 7 operate substantially independently. The setting of each governor is controlled through the medium of its own individual position-transmitter and position-receiver arrangements. In the case of the governor 6a, it is shifted by movement of its drivingly connected position-receiver 6b in response to changes in the setting of the position-transmitter 6c and similarly the governor 7a is controlled entirely by the changes in setting imparted to it by its position-receiver 7b which is in turn controlled by the interconnected position-transmitter 7c. The only interconnection of the two prime movers is through the differential indicator 31 and it serves simply to indicate the relative speeds and phase relation of the prime movers and not to control their governors. After the speeds of the prime movers have once been adjusted, in the manner described above, so that the two prime movers are in synchronism and in a predetermined phase relation, both being shown by the indicator 31, the governors 6a and 7a will normally tend to maintain the prime movers operating at such speeds. A continuous visual indication is afforded by the indicator 31 as to whether or not this desired relationship is being retained. It will, of course, be understood by those skilled in the art that when the governor controls are arranged as described for more or less independent governing of the prime movers that the rotors of the position control devices 6b and 6c can, without affecting the operation of the system be connected to any suitable source of alternating current rather than to the position-transmitter 6d; similarly, the rotors of the position control devices 7b and 7c could also be connected to any other suitable source of alternating current rather than the position-transmitter 7d. The connection of these devices to the position-transmitters 6d and 7d is preferred, however, since such a connection is utilized in the interconnected operation of the governor control circuits, as will presently appear, and, on the other hand, when the two are operating more or less independently the devices 6d and 7d serve as sources of alternating current just as effectively as any other source would.

I shall now describe how the governors 6a and 7a are arranged to have their position-receivers 6b and 7b interconnected, whereby any desired instantaneous phase angle between the crankshafts may be maintained indefinitely in any ordinary seaway without any need for manual control or regulation. In the particular circuit arrangement shown in Fig. 1, 28' indicates a source of direct current supply which in the case of one ship on which the present system of control was installed was a 125 volt direct current power circuit related to the source 28 of alternating current, a rotary converter being employed to convert the direct current to alternating current. Switches 6e and 7e are included in the line 28' normally held open, as by springs 38, but arranged to be closed automatically when the engines are on governor control, a diagrammatic connection being shown at 39 between each governor and its related switch, holding the switch closed against the action of its spring 38. Referring to Fig. 4, the contacts 40 in the line 28' have the circuit closed therethrough by the contact 41 when the rod 39 moves in a direction counter to the action of the spring 42 to move the throttle rod 43 toward closed position. That is to say, so long as the governor controls the throttle, the switch 6e or 7e, as the case may be, will be closed, but in the event the throttle is operated manually, as by means of the rod 44 (Fig. 4), the switch is opened. The crosshead shown at 45 is intended to illustrate diagrammatically a means whereby the throttle 43 may be operated by any one of the four means indicated, namely, either by the governor through rod 39 or by hand lever control through rod 44, or, in the event the reverse gear for the ship is operated, by the interlock rod 46, or, in the event an over-speed governor device is employed to shut off power in the event one or both governers go out of commission, by an over-speed governor rod 47. Referring again to Fig. 1, two push-button switches are included in the line 28', the switch 48 being normally closed and the switch 49 normally open. These switches are provided on the panel 23 of the control cabinet, as indicated in Fig. 3, and two electric lights 48' and 49' are provided adjacent the same, the former a green light and the latter a red light, for signal purposes, as hereinafter described. Manifestly, when the two engines are operating on governor control, a circuit is completed through the green light 48'. The switch 49, when closed, completes a circuit through a solenoid 50 to shift the six-pole selector switch 51 against the action of its spring 52 from the full line position shown in Fig. 1 to the dotted line position, and also complete a circuit through the blade 53 and contact 54 through a shunt circuit around the switch 49, whereby to keep the solenoid 50 energized thereafter, even though the switch 49 is allowed to open. The moment the switch 49 is closed, the red light 49' is lighted, and this light remains on so long as the shunt circuit 53—54 remains closed, keeping the solenoid 50 energized. The switch 48 can be opened at will to open the circuit through the solenoid 50 and allow the switch 51 to be thrown back under the action of its spring 52 to the full line position. In passing, attention is called to the three wires at 55 and at 56 connected to the wires 30 leading to the stator and rotor 32 and 33 of differential position-receiver 31. These wires are connected to the terminals on one side of the switch 51. Other wires 57 and 58 extend to the differential position-transmitters 6c and 7c, the wires 57 being connected to two sets of terminals of the switch 51 and the wires 58 to an intermediate set, as shown.

In operation, the green light 48' signals that both engines are on governor control, inasmuch as this light will not be on in the event either engine is on manual throttle control, the switches 6e and 7e being closed automatically by the governors associated therewith so long as the governors are in control of the throttles. The red light will appear only when the switch 49 is closed to interconnect the governors of the two engines through switch 51, as, for example, in a straight away cruise where there is no further likelihood of having to take over control of the engines manually. Before the switch 49 is closed and the switch 51 is still in the full line position, it is apparent that turning the dial 14 of say position-transmitter 6c will result in turning of the rotor of the position-receiver 6b, the current induced in the stator of the position-transmitter 6c flowing through wires 12 to the stator 9 of position-receiver 6b, and causing a corresponding turning of the rotor 8 thereof since the latter is connected through wires 11, 30, 55, and 57 to the rotor of the position-transmitter 6c. One may, therefore, control one engine independently of the other, as previously indicated. Now, however, let us assume that the switch 49 is closed so as to throw the switch 51 to the dotted line position: Under these conditions if the engine 6 is operating at some speed higher or lower than the speed of the engine 7, the first thing that occurs is the synchronization of the engines; that is to say, if the engine 6 is turning at say 1600 R. P. M. and the engine 7 at 1200 R. P. M., the two engines will immediately be synchronized at 1400 R. P. M., the engine 6 slowing down and the engine 7 speeding up to attain the medium speed, half way between the two extremes mentioned. The reason for this is that the crankshaft position transmitters 6d and 7d are interconnected with the governor differential position-receivers 6b and 7b, and a plus adjustment is given the one governor and a corresponding minus adjustment is given the other automatically. The circuit, assuming that the engine 6 is turning at a faster speed than the engine 7 as reflected in the turning of the needle 35 at motor 31, is as follows: from the stator 29 of the position-transmitter 6d through the wires 30 and 55 through switch 51 and wires 58 to differential position-transmitter 7c, and through wires 12 to the stator 9 of differential position-receiver 7b, whereby to produce a plus adjustment of the governor 7a and accordingly speed up the engine 7. At the same time, since the engine 7 is turning at a slower speed, a similar circuit including wires 56 and 57 results in a minus adjustment of the governor 6a by the differential position-receiver 6b. One engine speeds up and the other slows down practically instantaneously, whereupon, there being no further relative rotation of the rotors 25 of position-transmitters 6d and 7d, there is no functioning of either of the differential position-receivers 6b and 7b and the governors 6a and 7a are maintained in their new adjustments until some new condition arises necessitating a plus adjustment of the one governor and a minus adjustment of the other. It will be appreciated that after the prime movers have once been synchronized and a selected phase relationship established with the governor circuits interconnected through the switch 51, that upon any subsequent deviation from this speed and phase relationship the position-receivers 6b and 7b will move and continue to move in opposite senses, until the rotors of the position-transmitters 6d and 7d are returned to a predetermined angular position with respect to each other. In other words, it is not merely a matter of restoring the two prime movers to a condition in which they again operate at the same speed. On the other hand, when using position control devices such as Selsyns the governor adjustments will continue, with consequent alterations in prime mover speed, until the integrated sum of the revolutions of one prime mover exactly equal those of the other so that the two prime movers are not only in synchronism, but also exactly in phase. With the two governor control systems interconnected by closure of the selector or transfer switch 51 the differential position-transmitters 6c and 7c serve simply as static transformers in the respective circuits. A condition under which subsequent automatic control of the governor settings would be required might arise, for example, through a sharp rudder adjustment to port or starboard. Assume, for example, that a sudden turn is made to port, placing a sudden load on engine 7 and a corresponding reduction in load on engine 6, the slowing down of engine 7 resulting from the increased load will immediately result in a minus adjustment of the governor 6a of the engine 6, and a plus adjustment of governor 7a to keep the engines operating in synchronism operating at a medium speed and prevent one from racing due to lack of load while the other is laboring under added load. The constant balancing effect of the two governors keeps the engines operating in synchronism at all times but maintains the same average instantaneous phase relationship and results in smooth operation at low vibration level. The system when thrown into fully automatic control, as just described, is still subject to manual adjustment in these respects: One may increase or decrease the speed of the engines by means of the dial 21 or one may manipulate the dials 14 to obtain the precise crank-shaft angle relationship desired where only a pleasing hum remains to indicate the point of minimum vibration, or one may throw the system out of control instantaneously by pressing the button 48. Furthermore, the operator may change the speeds of the two prime movers simultaneously and in the same sense by adjusting the differential position-transmitters 6c and 7c through the medium of the knob 21. It is apparent that the system offers the following advantages:

(1) It may be added to existing engines without changing the existing means of maneuvering on manual throttle control.

(2) It goes out of service automatically the instant either throttle is manually manipulated, such as in answer to an emergency signal.

(3) It allows synchronizing without disturbance even when there is a difference between engine speeds of several revolutions per minute.

(4) It permits engineer to adjust angle between cranks to any desired value while in synchronism by momentarily altering speed of either engine and indicates on control board the exact instantaneous angle at all times.

(5) It allows the speed of both engines to be changed to any value from "slow" to "full" without changing the angle between crank-shafts.

(6) It may be used in the heaviest weather to advantage in maintaining desired engine speed within engine rating irrespective of depth of propeller submergence.

While I have described a completely electrical system of synchrophasing, it should be understood that all mechanical apparatus for producing similar operations herein obtained by electrical apparatus are considered as coming properly within the spirit and scope of the present invention. Thus, for example, two differential self-synchronizing motors, as, for example, motors 6b and 6c, when coupled together electrically might be replaced by differential gearing in an analogous mechanical apparatus. In other words, a differential self-synchronizing electric motor may properly be termed a differential gear device, or a means for transmitting motion differentially. The appended claims have accordingly been drawn with a view to covering all legitimate modifications and adaptations.

I claim:

1. In combination, two rotatable members, an individual adjustable speed control device for each of said members, a position-transmitter driven by each of said members, a differential position-receiver drivingly connected to each of said adjustable speed control devices, means electrically connecting one side of each of said differential position-receivers with the position-transmitter driven by its associated member, and means including a second and differential position-transmitter associated with each of said receivers for electrically connecting the other side of said differential receivers alternatively with either the first named transmitter driven by its own associated member or that driven by the other member.

2. In combination, a plurality of rotatable members, an individual adjustable speed control device for each of said members, a position-receiver drivingly connected to each of said adjustable speed control devices, means including a corresponding manually adjustable position-transmitter electrically connected to each of said position-receivers for changing the settings of the corresponding position-receivers and their connected speed control devices, and means for utilizing said position-transmitters as intermediate elements in a circuit for controlling the position of each of said position-receivers in response to changes in the relative speeds of said members.

3. In combination, a plurality of rotatable members, an individual adjustable speed control device for each of said members, a position-receiver drivingly connected to each of said adjustable speed control devices, means including a corresponding manually adjustable position-transmitter electrically connected to each of said position-receivers for changing the settings of the corresponding position-receivers and their connected speed control devices, means operable at will for simultaneously varying the positions of said position-transmitters in order to effect a corresponding simultaneous adjustment in the speeds of said rotatable members, and means for utilizing said position-transmitters as intermediate elements in a circuit for controlling the position of each of said position-receivers in response to changes in the relative speeds of said members.

4. In combination, a plurality of rotatable members, means affording a continuous visual indication of not only the relative speed relation of said members but also the phase relationship thereof, manually operable means for varying the speed of at least one of said members to attain a selected speed and phase relationship therebetween as shown by said indicating means, means for automatically and continuously maintaining a selected relative speed relation attained by a preliminary operation of said manually operable means, and selector means for rendering said last named means operable or inoperable at will.

5. In combination, a plurality of rotatable members, an individually adjustable speed control device for each of said members, means including an individual differential type device associated with each of said speed control devices for adjusting the setting thereof, and means responsive to a deviation from the initial phase relationship between said members for actuating each of said differential devices in a sense to effect a restoration of the phase relationship between said rotatable members to its initial value.

6. In combination, a plurality of prime movers, an adjustable speed control governor associated with each of said prime movers, each of said governors being effective automatically to restore its associated prime mover to a selected speed upon a momentary deviation therefrom, the selected speed being determined by the setting of the adjustable governor, and means for controlling the adjustment of the setting of each of said governors substantially simultaneously in response to a change in the differential between the integrated sum of the revolutions of the associated prime mover and that of another of said prime movers to maintain said prime movers automatically not only in synchronism but also in phase.

7. In combination, a plurality of prime movers, an adjustable speed control governor associated with each of said prime movers, means for adjusting the setting of each of said governors from a remote point, each of said adjustment means including a position-receiver drivingly connected to an associated governor and a position-transmitter electrically connected thereto, and means for actuating said position receivers in response to a change in differential between the integrated sum of the revolutions of the associated prime mover and that of another of said prime movers to maintain said prime movers automatically not only in synchronism but also in phase.

8. In combination, a plurality of rotatable members, an independently operable speed adjuster associated with the respective members, differential electric motors each having a normally stationary element and a rotatable element arranged to actuate respective ones of said speed adjusters, a position transmitter driven by one of said members and electrically connected to one element of each of said motors, and a position transmitter driven by another member and electrically connected to the other elements of said motors.

ALBERT KALIN.